United States Patent [19]
Ohsawa

[11] Patent Number: 4,874,221
[45] Date of Patent: Oct. 17, 1989

[54] FIBRE-TYPE LIGHT WAVELENGTH CONVERSION DEVICE

[75] Inventor: Seiichi Ohsawa, Saitama, Japan

[73] Assignee: Pioneer Electronic Corporation, Tokyo, Japan

[21] Appl. No.: 345,162

[22] Filed: May 1, 1989

[30] Foreign Application Priority Data

Oct. 14, 1988 [JP] Japan .................................. 63-259041

[51] Int. Cl.$^4$ ................................................ G02F 1/35
[52] U.S. Cl. .................................... 350/96.29; 307/425; 307/430; 350/96.15; 350/96.33
[58] Field of Search ............... 350/96.15, 96.16, 96.20, 350/96.29, 96.30, 96.33, 96.34, 353, 354; 307/425–430

[56] References Cited

U.S. PATENT DOCUMENTS 4,382,660 5/1983 Pratt, Jr. et al. ..................... 350/353
4,396,247 8/1983 Simon et al. ....................... 350/96.20
4,815,079 3/1989 Snitzer et al. ................. 350/96.33 X

FOREIGN PATENT DOCUMENTS 61-50122 3/1986 Japan .

Primary Examiner—John D. Lee
Attorney, Agent, or Firm—Foley & Lardner, Schwartz, Jeffery, Schwaab, Mack, Blumenthal & Evans

[57] ABSTRACT

A fibre-type light wavelength conversion device for changing the wavelength of an incident beam and emerging it as a beam having a predetermined wavelength includines a core and a cladding layer around the core. The device is characterized by the provision of a transparent conical layer provided around the cladding layer, the conical layer having a diameter increasing at a predetermined inclination from an end of incidence toward an end of emergence. According to a further feature the conical layer has a refractive index substantially the same as the cladding layer, and the inclination of the conical layer is set to be a half an angle of emergence of a beam emerging from the cladding layer with respect to a wave guiding direction.

4 Claims, 1 Drawing Sheet

LIGHT SECOND HARMONIC WAVE RING

FIBRE-TYPE LIGHT WAVELENGTH CONVERSION DEVICE

BACKGROUND OF THE INVENTION

1. Field of the Invention

The present invention relates to a fibre-type light wavelength conversion device.

2. Description of Background Information

An optical pickup is known by which high density writing and reading of information on and from a disc are enabled by changing the wavelength of a laser beam emitted from a laser source to a half the original wavelength by means of a light wavelength conversion device (reference is directed to Japanese Patent Application Laid-Open No. 61-50122).

As the light wavelength conversion device for use in this type of pickup, there is an optical fibre-type SHG (Second Harmonics Generator) using a second-order non-linear optical effect. A phase matching of Cerenkov radiation system is adopted in the optical fibre type SHG. With this system, it is possible to generate a second harmonic wave (referred to as SH wave hereinafter) whose phase matching is attained almost automatically. The general concept of this device is shown in FIGS. 1A and 1B.

In FIG. 1A, when the fundamental wave mode is propagated through the core with the effective reflective index of $N(\omega)$, the non-linear polarizing wave generating the SH wave is also propagated at the same phase velocity $C/N(\omega)$ (C is the speed of light). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the pont A propagates through the clad and reaches to a point C after the elapse of the unit time and the angle $\theta$ is such an angle that lines AC and BC are perpendicular to each other, then the plane of the SH wave which is generated from the non-linear polarized wave becomes equal to BC, and as a reuslt, a coherent SH wave is generated.

The condition of the phase matching is, according to the figure, as follows:

$$N(\omega) = N_{clad}(2\omega) \cos \theta \quad (1)$$

where $N_{clad}(2\omega)$ is the refractive index of the clad for the SH wave. This in turn gives, $$N(\omega) < N_{clad}(2\omega) \quad (2)$$

The above equation means that the SH is generated automatically in the direction where the phase matching is performed when at least the condition mentioned by the equation (2) is satisfied. Generally, with the refractive indices of the clad and core for the fundamental wave being $n_{clad}(\omega)$ and $n(\omega)$ and with air as the overlayer, the condition for the fundamental wave to propagate through the core as a mode is expressed as follows:

$$N_{clad}(\omega) < N(\omega) < n(\omega) \quad (3)$$

Wavelength dispersion of the clad's refractive index will now be considered, Since $n_{clad}(\omega) < n_{clad}(\omega)$, the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of the core even under the following condition.

$$N_{clad}(\omega) < n_{clad}(2\omega) < n(\omega)$$

The second harmonic wave generated in this way is propagated in a clad mode as illustrated in FIG. 1B in which total reflection occurs repeatedly at the boundary between the clad and air. Then, the second harmonic wave is emitted in conical shape from the end of fibre in directions making an angle $\theta$ relative to the fibre's direction. The equiphase front of the second harmonic wave emitted in this way is in a conical surface with an axis on the central axis of the fibre.

In this fibre-type light wavelength conversion device, the phase of the SH wave will be inverted if the reflection of the SH wave occurs between the boundary surface of the cladding layer and air while it propagates through the cladding layer. Hence, for an emerging SH wave ring illustrated in FIG. 1B, the inner SH wave will have a phase difference of 180° relative to the outer SH wave by the above-described reflection at the boundary surface.

OBJECT AND SUMMARY OF THE INVENTION

An object of the present invention is to provide a fibre-type light wavelength conversion device which is adapted to separate SH waves having different phases and to effectively utilize SH waves having the same phase.

The present invention provides a fibre-type light wavelength conversion device in which a transparent conical layer whose diameter increases from an end of incidence to an end of emergence is provided outside of the cladding layer.

Preferably, the conical layer is determined to have a refractive index substantially the same as that of the cladding layer, and the angle of its conical surface is determined to be a half an angle of emergence of a beam emerging from the cladding layer with respect to the wave guiding direction.

DETAILED DESCRIPTION OF THE PREFERRED EMBODIMENT

The preferred embodiment of the present invention will be explained with reference to the accompanying drawings hereinafter.

Figure 1A:
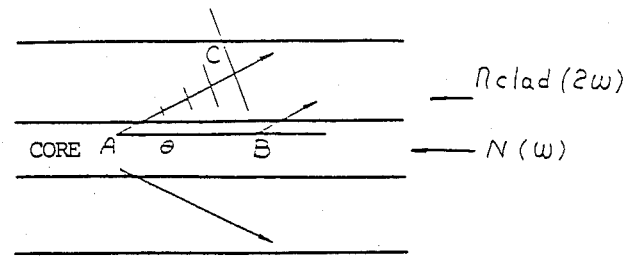
FIGS. 1A and 1B are diagrams for explaining the concept of Cerenkov radiation system phase matching SHG.
Figure 1B:
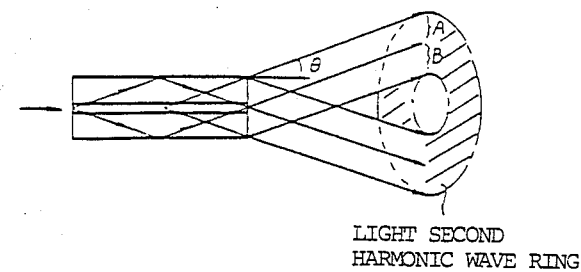
Figure 2:
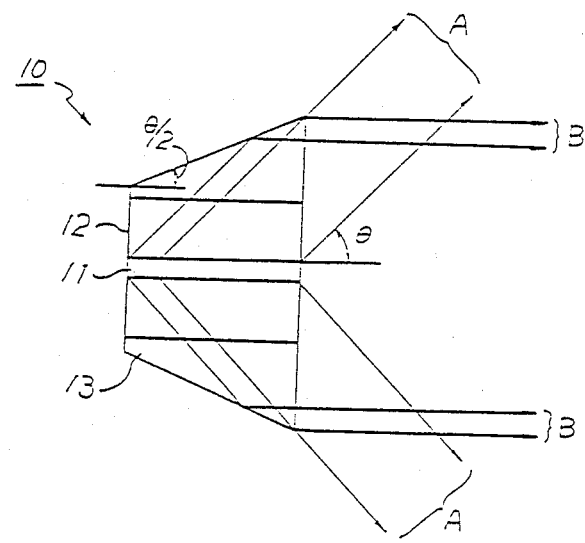
FIG. 2 is a diagram showing an embodiment of the fibre-type light wavelength conversion device according to the present invention.

In FIG. 2, a fibre-type light wavelength conversion device 10 according to the present invention is made up of a core 11, a cladding layer 12 provided around the core 11, and a transparent conical layer 13 which is provided in such a manner that its diameter increases from an end of incidence to an end of emergence. This conical layer 13 may be formed solidly with the cladding layer 12 using the same material. Otherwise, the conical layer 13 may be made from a resin such as an acrylic resin or a glass having a refractive index substantially the same as that of the cladding layer 12. The inclination of the conical surface of the conical layer 13 is preferably determined to be a half an angle of emergence of the beam emerging from the cladding layer 12 with respect to the wave guiding direction (the central axis of the fibre).

By providing the conical layer 13 around the cladding layer 12, which conical layer 13 has a diameter increasing from the end of incidence toward the end of emergence, the SH wave B traveled from the cladding layer 12 to the conical layer 13 is reflected at an internal surface of the conical layer and emerges in a direction entirely different from the direction of the SH wave A directly emerging at an angle of emergence $\theta$. In this way, the device peforms the separation of the SH waves A and B having phases different from each other. Especially by setting the inclination of the conical surface of the conical layer 13 at $\theta/2$, the SH wave B emerges as a parallel wave traveling in parallel with the direction of the fibre's central axis.

When it is attempted to efficiently apply the second harmonic wave in the opto-electronics, it is desirable to make flat the plane of the emerging wave. Therefore it is conceivable to dispose a conical prism with a conical surface in the optical path of the beam emitted from the wavelength conversion device 10, so that a conical equiphase front is made flat by collimating the second harmonic wave (making it parallel) by means of the function of such a conical prism.

On the other hand, in the case of the embodiment of the present invention describe above, the device can be made by setting the inclination of the conical layer 13 at $\theta/2$ such that the SH wave B emerges as a plane wave with out using any additional optical part such as a conical prism.

As explained in the foregoing, a transparent conical layer whose diameter increases from the end of incidence to the end of emergence is provided around the cladding layer in the fibre-type light wavelength conversion device according to the present invention. Thus the SH waves having different phases are separated completely with the device according to the invention.

Especially the refractive index of the conical layer may preferably be made equal to that of the cladding layer and the inclination of the conical layer may be set at a half the angle of emergence of the beam emerging from the cladding layer with respect to the wave guiding direction. With this feature, it is possible to obtain one of the SH waves as a plan wave without using any separate part such as a conical prism.

What is claimed is:

1. A fibre-type light wavelength conversion device for changing the wavelength of an incident beam and emerging it as a beam having a predetermined wavelength, comprising:
   a core;
   a cladding layer around said core; and
   a transparent conical layer provided around said cladding layer, said conical layer having a diameter increasing at a predetermined inclination from an end of incidence toward an end of emergence.

2. A device as set forth in claim 1, wherein said conical layer has a refractive index substantially the same as the refractive index of said cladding layer, and wherein an inclination of a conical surface of said conical layer is a half an angle of emergence of a beam emerging from said cladding layer with respect to a wave guiding direction.

3. A device as set forth in claim 1, wherein said conical layer is formed solidly with said cladding layer.

4. A device as set forth in claim 1, wherein said conical layer is made from a resin or a glass.

* * * * *